Dec. 28, 1965  E. A. BRANDT ETAL  3,225,635
DEVICE FOR POSITIONING FLAT ARTICLES
Filed Feb. 10, 1964  3 Sheets-Sheet 1
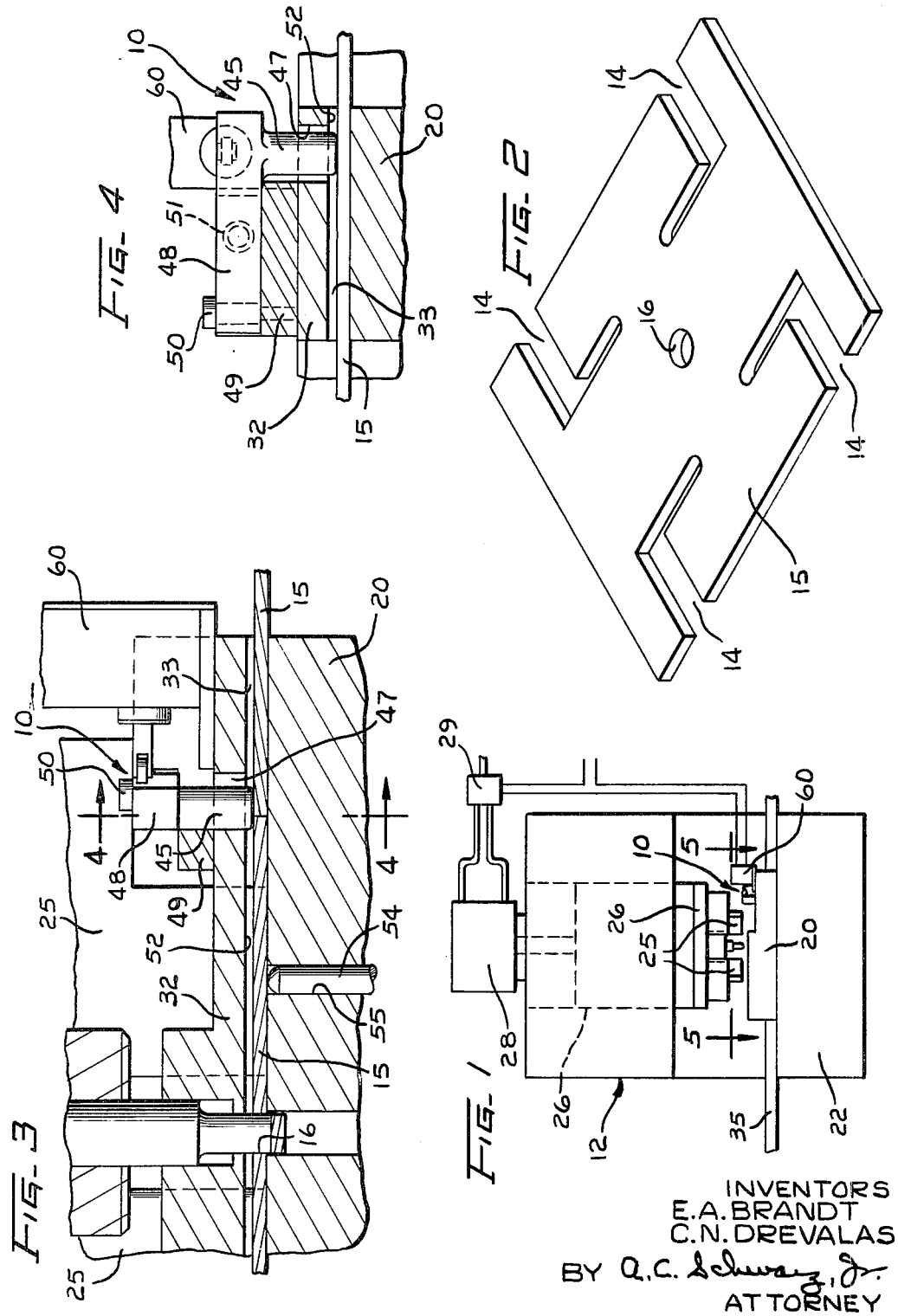
INVENTORS
E. A. BRANDT
C. N. DREVALAS
BY A.C. Schwarz, Jr.
ATTORNEY

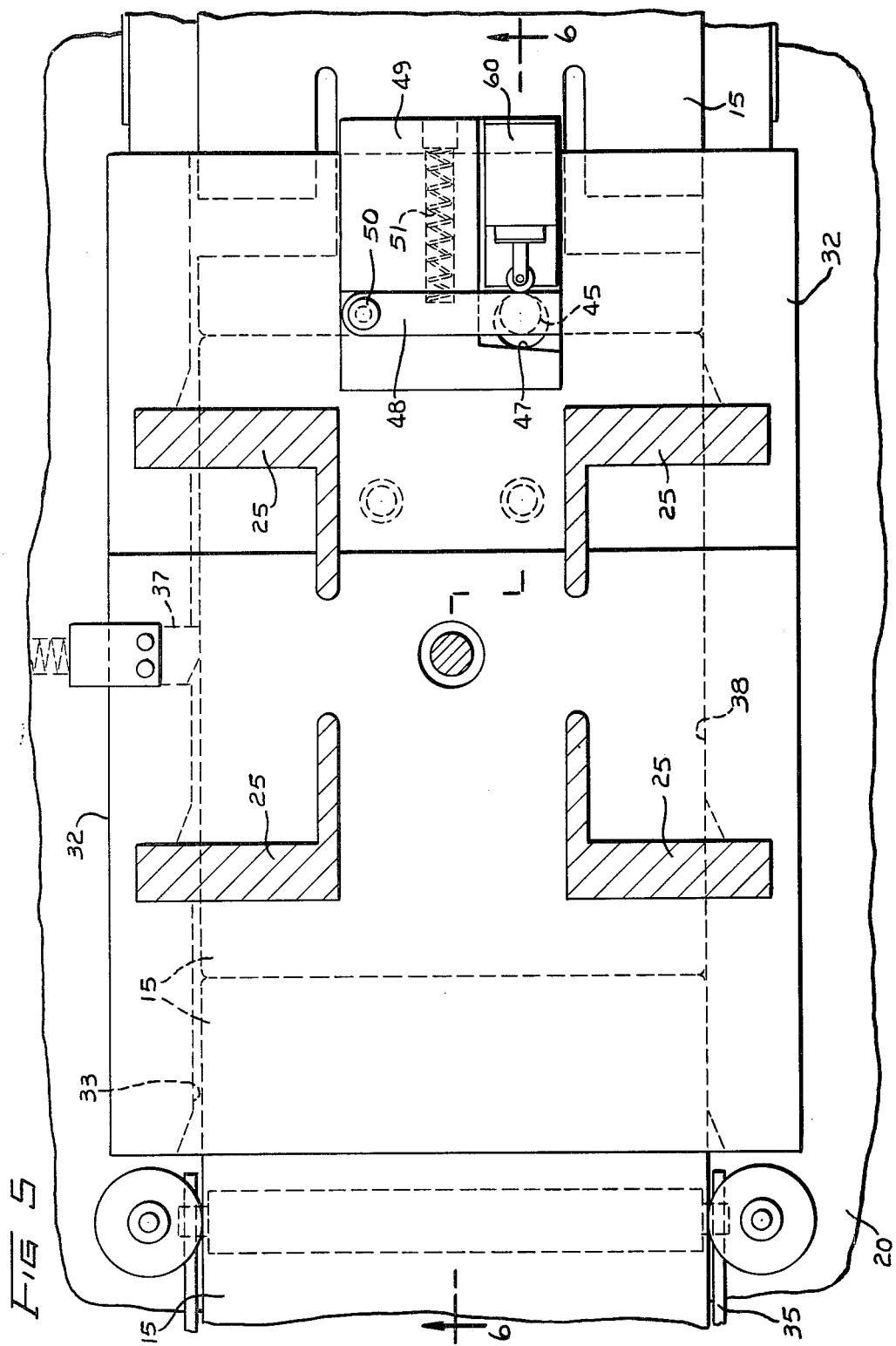

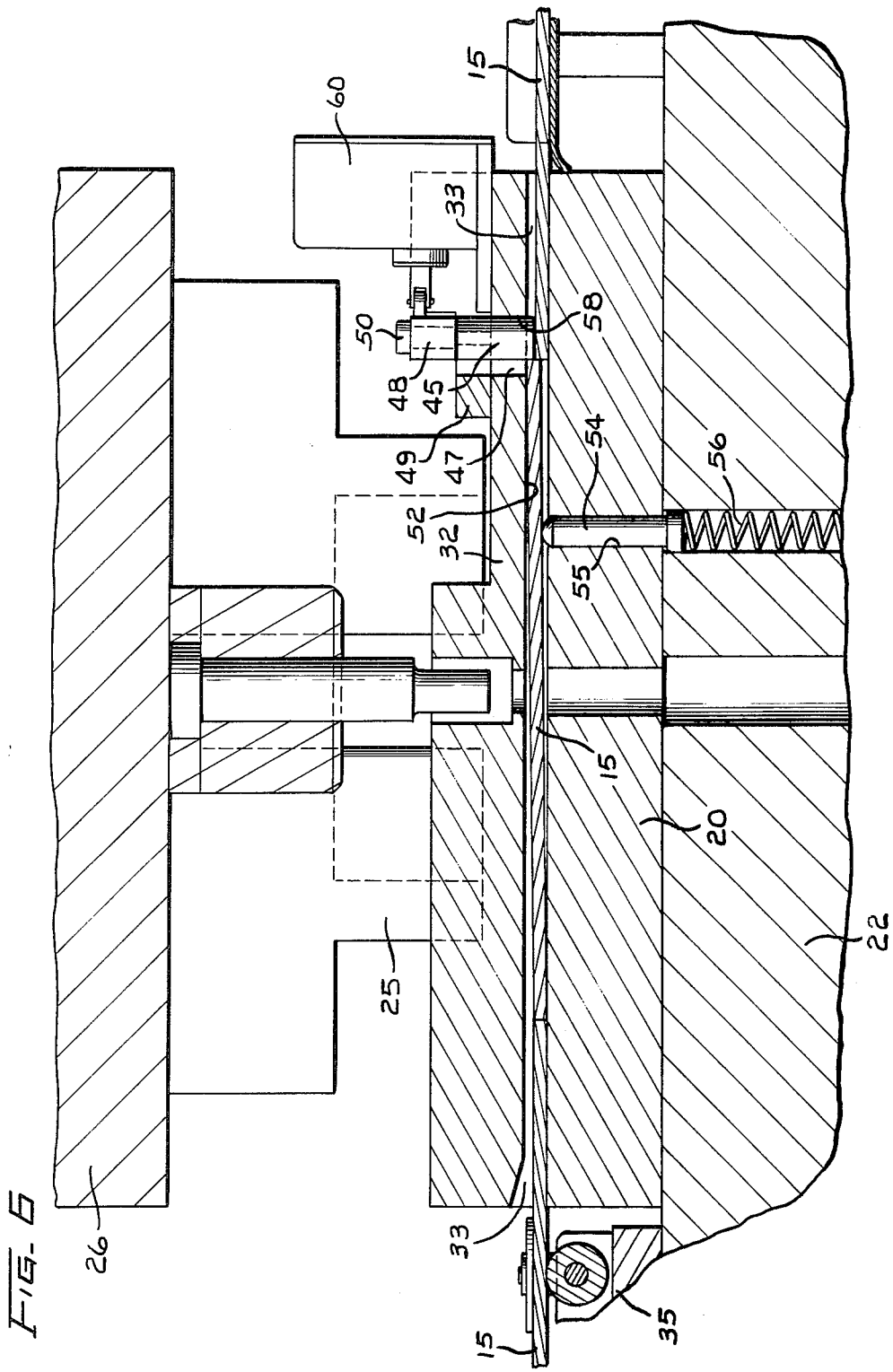

United States Patent Office 3,225,635
Patented Dec. 28, 1965

3,225,635
DEVICE FOR POSITIONING FLAT ARTICLES
Edward A. Brandt, Chicago, and Constantine N. Drevalas, Wheaton, Ill., assignors to Western Electric Company, Incorporated, New York, N.Y., a corporation of New York
Filed Feb. 10, 1964, Ser. No. 343,780
5 Claims. (Cl. 83—268)

This invention relates to a work positioning device, and more particularly to a device for positioning flat rectangular articles in a machine in which the articles are advanced intermittently to a work position in abutting relation to one another.

In performing work operations on certain articles in a punch press, a relatively simple method of moving the articles to and from a work position in the press is to arrange the parts in a row in abutting engagement with each other and to impart movement to the endmost part to cause the punched part to be moved from the work position and the following part to move thereinto. However, where the articles are in the form of flat rectangular blanks, difficulty has been experienced with the stop mechanisms available in effecting the stopping of all of the articles, thus advanced, in the work position.

An object of the invention is to provide an improved device for positioning successive flat articles in a work position in the path of a tool in an apparatus in which the articles are advanced to the work position by the movement of other articles in abutting engagement therewith.

A device illustrating certain aspects of the invention as applied to a punch press for operating on flat articles may include a guideway on the die for guiding a row of the flat articles in abutting engagement with one another along a horizontal path between the punch and die of the press. A stop is mounted in a predetermined position in the guideway above the normal path of movement of the articles for limited horizontal movement longitudinally of the guideway and is spring biased for movement from a gaging position to a second position in a direction opposed to the movement of the articles. The rounded upper end of an upwardly biased plunger mounted on the die projects into the guideway adjacent the stop to raise the leading portion of an advancing article to a predetermined level and cause the upper portion of the article to etxend above the preceding article and, as it continues its horizontal movement, to engage the stop and move it to the gaging position and be stopped thereby in a predetermined position relative to the punch and die.

In response to movement of the stop to the gaging position by the article, a switch is actuated and mechanism is rendered operative to actuate the press. As the punch descends to punch the article, the article is depressed and disengaged from the stop which returns to its second position in overlying relation to the end of the article just punched whereby another unpunched may be added to the row of articles and advanced to initiate another cycle of operation.

Other objects, advantages and novel aspects of the invention will become apparent upon consideration of the following detailed description, in conjunction with the accompanying drawings, in which:

FIG. 1 is a diagrammatic front view of a hydraulically operated punch press with the improved article positioning device thereon;

FIG. 2 is a perspective view of a flat article after it has been operated on in the punch press;

FIG. 3 is an enlarged fragmentary vertical section through the punch press showing the punch in actuated position and a stop for the articles in a non-gaging position;

FIG. 4 is a fragmentary vertical cross-sectional view through the punch press taken on the line 4—4 of FIG. 3;

FIG. 5 is a plan sectional view of the punch press taken on the line 5—5 of FIG. 1 and showing the stop in its gaging position; and FIG. 6 is a fragmentary vertical sectional view of the punch press taken on the line 6—6 of FIG. 5 and showing the stop moved to the gaging position by an article.

Referring to FIG. 1 of the drawings, the article positioning device 10 is shown applied to a punch press 12 for punching L-shaped slots 14 (FIG. 2) in opposite margins of a flat rectangular article or blank 15 and an aperture 16 in the center thereof. The apparatus includes a stationary die 20 mounted on a portion 22 of the press and a die 25 secured to a reciprocatory ram 26 of the press. The ram 26 is operated by a hydraulic actuator 28 in response to the admission of fluid selectively to opposite ends thereof from a suitable source under control of an electrically operated valve 29.

A guide and stripper member 32 is secured to the die 20 and cooperates with the upper surface thereof to form a guideway 33 for guiding the articles 15 along a straight horizontal path between the punch and die. The flat articles 15 are manually placed on a roller track 35 aligned with the guideway 33 and are manually advanced thereon in abutting relation to each other into the guideway 33. The articles are engaged successively along one edge of the guideway by a yieldable plunger 37 (FIG. 5) on one side of the guide 32 and are urged thereby against the opposite wall 38 of the guideway 33 to orient the flat articles 15 laterally relative to the punch and die.

The device 10 for positioning the articles 15 longitudinally of the guideway 33 comprises a vertically disposed cylindrical stop 45 extending downwardly into the guideway 33 through an enlarged aperture 47 in the guide 32. An arm 48 extends horizontally from the stop 45 and is supported on a bracket 49 for pivotal movement about a vertical pin 50 and supports the stop 45 for limited horizontal movement within the aperture 47 and longitudinally of the guideway 33. A spring 51 which is mounted in a recess in the bracket 49 urges the stop 45 to a normal inoperative second position shown in FIG. 3.

The lower end of the stop 45 is located above and adjacent to the normal path of movement of the articles 15 in the guideway 33. The guideway 33 is sufficiently high to permit the raising of a leading portion of an advancing article to a predetermined level so that the upper portion of the forward edge of the article 15 projects above the preceding article sufficiently for engagement with and actuation of the stop 45 without losing its abutting engagement with the preceding article. The upper surface 52 of the guideway serves to prevent excessive upward movement of articles 15.

To effect the raising of the forward portion of successive advancing articles 15 as they approach the stop 45, a headed plunger 54 is mounted for vertical movement in an aperture 55 in the die 20. The plunger is urged upwardly by a spring 56 to a normal position (FIG. 6) in which the upper rounded end of the plunger projects above the upper surface of the die 20 into the guideway 33 for engaging and raising the leading end portions of successive advancing articles 15. Thus, as an article is advanced, the leading edge will be engaged by the plunger 54 and deflected upwardly thereby against the upper surface 52 of the guideway 33 and will then engage the stop 45 and move it horizontally to a gaging position against the surface 58 in the aperture 47 (FIG. 6), in which position the stop 45 arrests the movement of the article 15 and locates it in a predetermined relation to the punch and die.

The movement of the stop 45 to the gaging position shown in FIG. 6 also actuates a switch 60 secured to the bracket 49. The actuation of the switch 60 in turn effects the actuation of the valve 29 and the reciprocation of the ram 26 and the punch 25. As the punch 25 descends it first presses the raised forward end of the article 15 downward into engagement with the die 20 and thereafter effects the punching of portions of the article therefrom. As the leading edge of the article 15 is depressed by the punch 25, the stop 45 is released from the article and is returned by the spring 51 to its second position in overlying relation to the forward end of the article as shown in FIG. 3.

In the operation of the apparatus, successive articles 15 are placed on the roller track 35 and the endmost article is manually pushed forward to advance the row of abutting articles into the guideway 33 between the punch and die. As the leading edge of an article approaches the stop 45, it engages the rounded upper end of the plunger 54 and is deflected upwardly thereby in the guideway 33 into engagement with the upper surface 52 thereof and advances horizontally in the raised condition into engagement with the side of the lower portion of the stop 45 and moves the stop from the normal unoperative position as shown in FIG. 3 to the gaging position shown in FIG. 6. This movement of the stop 45 to the gaging position effects the actuation of the switch 60 which in turn effects the operation of the actuator 28 and the reciprocation of the punch 25, during which the article 20 is depressed and punched and the stop 45 is disengaged from the forward edge of the article and is moved horizontally into an overlying position relative thereto.

To effect the repetition of the cycle of operation, the operator places an unpunched article on the track 35 and pushes it to advance the row of articles until the movement thereof is arrested by the stop 45 in its gaging position. As successive articles 15 are added to the trailing end of the row and manually advanced to effect the punching of successive articles, the articles thus punched will be intermittently advanced by the following articles along the guideway 33 and from the punch press.

It is to be understood that the above-described arrangements are simply illustrative of the application of the principles of this invention. Numerous other arrangements may be readily devised by those skilled in the art which will embody the principles of the invention and fall within the spirit and scope thereof.

What is claimed is:

1. A device for positioning articles in an apparatus having a vertically movable tool which comprises:
   means for supporting a plurality of articles in abutting relation to one another for movement along a horizontal path transversely of and into the path of movement of the tool;
   a stop member mounted above and in close proximity to the path of movement of the articles for horizontal movement to and from one position and a gaging position;
   resilient means for moving said stop member from the gaging position to said one position; and
   means yieldably mounted in the path of movement of the articles and adjacent said stop member for raising the leading end of an advancing article to a predetermined elevation with the upper portion of the article extending above the preceding article without disengaging the preceding article so that the upper portion of the article will engage and move said stop member horizontally to the gaging position and cause the article to be stopped thereby in a predetermined position beneath the tool.

2. In an apparatus having a movable tool, and an actuator for moving the tool up and down, the combination therewith of:
   means for supporting a plurality of articles in abutting relation to one another for movement along a horizontal path transversely of and into the path of the tool;
   a stop member mounted above the path of movement of the articles for limited horizontal movement longitudinally of such path to a gaging position in a predeterimned spaced relation to the tool;
   resilient means for moving said stop member from said gaging position in a direction opposed to the advancing movement of the articles;
   yieldable means extending upwardly into said guideway adjacent said stop member for raising the leading end of an advancing article with the upper portion of the article extending above the path of movement of the articles so as to engage said stop member and move it to the gaging position and cause the article to be located by said stop member in a predetermined position beneath the tool; and
   means responsive to the movement of said stop member to said gaging position for effecting the operation of the actuator and the movement of the tool into engagement with the article.

3. A device for positioning articles in an apparatus having a vertically movable tool which comprises:
   means having a guideway for supporting a row of articles in abutting relation to one another for movement along a horizontal path transversely of and into the path of movement of the tool, said guideway having an upper surface spaced above the articles supported therein for limiting the upward movement of the articles;
   a stop member mounted for horizontal movement between first and second positions in the upper portion of said guideway above and in close proximity to the path of movement of said articles;
   resilient means for moving said stop member from the first position to the second position in a direction opposed to the advancing movement of the articles; and
   yieldable means extending upwardly into said guideway adjacent to said stop member for raising the leading portion of an advancing article into engagement with said upper surface of said guideway so that the raised portion of the advancing article will engage said stop member and move said stop member to the first position and be located by said stop member in a predetermined position beneath the tool.

4. In an apparatus having a movable tool, and an actuator for moving said tool up and down, the combination therewith of:
   means forming a guideway for supporting a row of articles in abutting relation to each other for movement along a horizontal path transversely of and into the path of movement of the tool, said guideway having an upper surface spaced above the articles supported therein for limiting the upward movement of the articles;
   a stop member mounted in the upper portion of said guideway above and in close proximity to the path of movement of the articles for limited horizontal movement longitudinally of said guideway to a gaging position;
   resilient means for moving said stop member from said gaging position in a direction opposed to the advancing movement of the articles;
   yieldable means extending upwardly into said guideway in the path of the articles for raising the leading portion of an article into engagement with said upper surface of said guideway as it approaches said stop member so that the raised portion of the advancing article will engage said stop member and move it to the gaging position and be located by said stop member in a predetermined position beneath said tool; and
   means responsive to the movement of said stop member to said gaging position for effecting the operation of the actuator and of the tool.

5. A device for positioning articles in an apparatus having a vertically movable tool which comprises:
- means for supporting a plurality of articles in abutting relation to one another for movement along a horizontal path transversely of and into the path of the tool;
- a stop member mounted above and in close proximity to the path of the articles for horizontal movement longitudinally of such path to a gaging position in a predetermined spaced relation to the tool and to a second position;
- yieldable means for moving said stop member from the gaging position in a direction opposed to the movement of the articles to the second position;
- an element mounted on said supporting means for vertical movement to and from an upper position with the upper end of said element disposed in the path of movement of the articles for engaging and lifting the leading end of an advancing article so that the upper portion of the article is at an elevation to engage and move said stop member horizontally to the gaging position and be stopped by said stop member in a predetermined position beneath the tool;
- resilient means for supporting said element in the upper position; and
- means for limiting the upward movement of the leading end portion of the article so as to prevent disengagement thereof from the preceding article.

No references cited.

WILLIAM W. DYER, JR., *Primary Examiner.*

ANDREW R. JUHASZ, *Examiner.*